(12) United States Patent
Dohi et al.

(10) Patent No.: US 9,038,663 B2
(45) Date of Patent: May 26, 2015

(54) OPENING DEGREE DETECTION DEVICE FOR AUTOMATICALLY OPERATED VALVE

(75) Inventors: Ryousuke Dohi, Osaka (JP); Atsuo Tomita, Osaka (JP); Kouji Nishino, Osaka (JP); Yohei Sawada, Osaka (JP); Nobukazu Ikeda, Osaka (JP)

(73) Assignee: FUJIKIN INCORPORATED, Osaka-Shi (JP)

( * ) Notice: Subject to any disclaimer, the term of this patent is extended or adjusted under 35 U.S.C. 154(b) by 72 days.

(21) Appl. No.: 13/988,836

(22) PCT Filed: Nov. 17, 2011

(86) PCT No.: PCT/JP2011/076483
§ 371 (c)(1),
(2), (4) Date: Aug. 13, 2013

(87) PCT Pub. No.: WO2012/070458
PCT Pub. Date: May 31, 2012

(65) Prior Publication Data
US 2013/0319551 A1    Dec. 5, 2013

(30) Foreign Application Priority Data

Nov. 25, 2010   (JP) .................................. 2010-262676

(51) Int. Cl.
*F16K 37/00*   (2006.01)
*F16K 31/122*  (2006.01)

(52) U.S. Cl.
CPC ............. *F16K 37/0041* (2013.01); *F16K 37/00* (2013.01); *F16K 31/1221* (2013.01); *F16K 37/0083* (2013.01)

(58) Field of Classification Search
CPC ........................................................ F16K 37/00
USPC ...................................... 137/554; 324/207.24
See application file for complete search history.

(56) References Cited

U.S. PATENT DOCUMENTS

| 3,850,196 | A | * | 11/1974 | Fales .............................. 137/554 |
| 5,706,855 | A |   | 1/1998  | Heiniger |
| 5,742,161 | A | * | 4/1998  | Karte ......................... 324/207.16 |
| 6,175,233 | B1| * | 1/2001  | McCurley et al. ......... 324/207.2 |

(Continued)

FOREIGN PATENT DOCUMENTS

| JP | 8-326950 | 10/1996 |
| JP | 9-14499  | 1/1997  |

(Continued)

*Primary Examiner* — Craig Schneider
*Assistant Examiner* — Angelisa Hicks
(74) *Attorney, Agent, or Firm* — Locke Lord LLP; James E. Armstrong, IV; George N. Chaclas (57) ABSTRACT

To provide an opening degree detection device for an automatically operated valve which is easily assembled into an automatically operated valve, makes it easy to ensure detection accuracy at the time of assembling the opening degree detection device, and is easily applicable to an existing automatically operated valve. The opening degree detection device includes: a base plate 4 which is detachably mounted on an automatically operated valve 2; a displacement sensor 5; and a target 6 having an inclined detection surface 6a which is detected by the displacement sensor 5. The target 6 is fixed to the base plate 4. The displacement sensor 5 is supported on a valve stem 14 by way of a sensor support member 21, and the sensor support member 21 is supported on the base plate 4 by way of a guide means.

19 Claims, 8 Drawing Sheets

(56) References Cited

U.S. PATENT DOCUMENTS

| | | | |
|---|---|---|---|
| 6,552,532 B1 * | 4/2003 | Sako | 324/207.2 |
| 6,666,429 B2 | 12/2003 | Fukano et al. | |
| 6,776,389 B2 * | 8/2004 | Ito | 251/129.04 |
| 7,219,691 B2 * | 5/2007 | Gethmann et al. | 137/554 |
| 2008/0121290 A1 * | 5/2008 | Pape et al. | 137/551 |
| 2008/0257415 A1 * | 10/2008 | Ohmi et al. | 137/14 |

FOREIGN PATENT DOCUMENTS

| | | |
|---|---|---|
| JP | 10-068474 | 3/1998 |
| JP | 2002-181221 A | 6/2002 |
| JP | 2008-196596 A | 8/2008 |

* cited by examiner

OPENING DEGREE DETECTION DEVICE FOR AUTOMATICALLY OPERATED VALVE

TECHNICAL FIELD

The present invention relates to an opening degree detection device for an automatically operated valve which is mounted on an automatically operated valve where a fluid flow path formed in a valve body is opened or closed due to the movement of a valve stem caused by an operation of an actuator, and detects opening degree of the fluid flow path.

BACKGROUND ART

To detect an open/close state of a fluid flow path, there has been known a device which detects an upper end position and a lower end position of a valve stem using limit switches. Although such an opening degree detection device can detect a fully open state or a fully closed state, the opening degree detection device has a drawback that the opening degree detection device cannot detect an intermediate state such as the opening degree of 5% or the opening degree of 95%. In view of the above, patent literature 1 proposes an opening degree detection device for an automatically operated valve where, using a displacement sensor fixed to a casing of an automatically operated valve and a tapered cylindrical target integrally mounted on a valve stem, the opening degree of the fluid flow path is detected based on a value measured by the displacement sensor which is arranged to face an inclined detection surface (tapered cylindrical surface) of the target which moves along with the upward and downward movement of the valve stem.

CITATION LIST

Patent Literature

PTL 1: Japanese Patent No. 2690886

SUMMARY OF INVENTION

Technical Problem

In a continuously monitoring device of a valve stroke (referred to as "opening degree detection device for an automatically operated valve" in this specification) disclosed in the above-mentioned patent literature 1, it is necessary to form an automatically operated valve into a dedicated shape, and it is necessary to mount a displacement sensor and a target on the automatically operated valve respectively. Accordingly, the opening degree detection device for an automatically operated valve has a drawback that the detection device is not applicable to an existing automatically operated valve. Further, such an opening degree detection device has a drawback that an operation of assembling the opening degree detection device becomes cumbersome at the time of installing piping, at the time of exchanging the opening degree detection device, at the time of performing maintenance of the opening degree detection device or the like. The opening degree detection device also has a drawback that it is difficult to ensure detection accuracy at the time of assembling the opening degree detection device into the automatically operated valve.

It is an object of the present invention to provide an opening degree detection device for an automatically operated valve which is easily assembled into an automatically operated valve, makes it easy to ensure detection accuracy at the time of assembling the opening degree detection device, and is easily applicable to an existing automatically operated valve.

Solution to Problem

The present invention is directed to an opening degree detection device for an automatically operated valve which is installed in an automatically-operated valve where a fluid flow path formed in a valve body is opened or closed due to the movement of a valve stem caused by an operation of an actuator, the opening degree detection device including: a base member which is detachably mounted on the valve body; a displacement sensor which is moved along with the valve stem; and a target having an inclined detection surface which is detected by the displacement sensor, wherein the displacement sensor and the target are supported on the base member.

It is necessary for the automatically operated valve to have the constitution where an upper end portion of the valve stem projects upward from a casing. Further, it is preferable that a sensor positioning surface which receives a lower end of a sensor support member on which the displacement sensor is mounted is formed on the upper end portion of the valve stem. Such a sensor positioning surface may be formed, for example, by forming a flat surface by applying working to the upper end portion of the valve stem or by threadedly engaging a male threaded member having a flat top surface into the valve stem where a female threaded portion extending in the axial direction is formed on an upper end portion. The sensor positioning surface is not limited to a flat surface, and may be formed of any surface provided that the surface can receive a lower end of the sensor support member.

The automatically operated valve is not limited with respect to the constitutions other than the constitution that the upper end portion of the valve stem projects upward from the casing. The automatically operated valve is usually assumed to include: the valve body in which the fluid flow path is formed; the casing which is provided above the valve body; a valve element which opens or closes the fluid flow path; a valve stem which moves the valve element in the opening direction or in the closing direction by rising or lowering; and the actuator which drives the valve stem.

The actuator is a drive means which upwardly and downwardly moves the valve stem, and is an actuator which makes use of compressed air (pneumatic actuator), for example. However, the actuator may be an actuator which uses a solenoid (electromagnetic actuator) or an actuator which makes use of other drive means.

The inclined detection surface is, for example, a linear inclined surface which is inclined with respect to the axial direction (moving direction) of the valve stem by approximately 1° to 10°, for example. However, it is sufficient for the inclined detection surface that a value measured by the displacement sensor is changed when the valve stem is moved, and the inclined detection surface is not limited to the linear inclined surface.

In mounting such an opening degree detection device on the automatically operated valve, the displacement sensor and the target may be assembled to the base member in advance and, thereafter, the base member may be detachably mounted on (a top surface of the casing of) the automatically operated valve. Accordingly, an assembling operation of the opening degree detection device into the automatically operated valve can be easily performed. Further, positioning of the displacement sensor and the target can be performed before the operation of assembling the opening degree detection device into the automatically operated valve and hence, the detection accuracy at the time of assembling can be easily ensured. Further, provided that an automatically operated valve is an automatically operated valve where an upper end portion of a valve stem projects upward from a casing, the opening degree detection device for an automatically operated valve of the present invention can be installed on the automatically operated valve and hence, the opening degree detection device for an automatically operated valve of the present invention is easily applicable to an existing automatically operated valve.

The automatically operated valve may preferably be configured such that the upper end portion of the valve stem projects upward from the casing, the sensor positioning surface which receives the lower end of the sensor support member is formed on the upper end portion of the valve stem, the sensor support member and the target are mounted on the base member, and the base member is detachably mounted on the upper end portion of the valve stem.

As the displacement sensor, for example, it may be possible to use a displacement sensor which includes a planar coil, an oscillation circuit and an integration circuit, changes an oscillation frequency corresponding to a change in distance between the displacement sensor and a conductor which faces the displacement sensor in an opposed manner, converts the frequency into an integrated value by the integration circuit, and outputs the integrated value as a digital signal (noncontact magnetic sensor). However, the displacement sensor is not limited to such a sensor.

The displacement sensor is upwardly and downwardly moved along with the movement (upward and downward movement) of the valve stem so that a distance between the displacement sensor and the inclined detection surface is changed. Opening degree of the fluid flow path can be detected by converting such a distance into an upwardly-and-downwardly-moving distance of the valve stem.

It is preferable that the displacement sensor is supported on the valve stem by way of the sensor support member, and the sensor support member is supported on the base member by way of the guide means in an upwardly and downwardly movable manner.

The guide means may include, for example: guide shafts which are mounted on the base member in an erected manner such that the guide shafts face each other in an opposed manner with the sensor support member interposed therebetween; and guide shaft insertion holes which are formed in the sensor support member, and allow the respective guide shafts to pass therethrough, and the sensor support member may be integrally moved with the valve stem by being guided by the guide shafts. Although it is preferable that the guide shafts are arranged such that two guide shafts form one pair, the number of guide shafts may be one, two or more provided that there arises no problem in sliding of the sensor support member or the like.

Due to such a constitution, when the sensor support member is upwardly and downwardly moved with respect to the base member, there is no possibility that the sensor support member will be inclined or caught by the guide shafts so that the smooth movement of the sensor support member (displacement sensor) can be ensured whereby the excellent detection accuracy is acquired.

Further, the guide shafts may be provided by one pair, respective upper end portions of the guide shafts may be fixed to a connecting member, the target may be formed into a rectangular plate shape, and may have a lower end portion thereof mounted on the base member and an upper end portion thereof mounted on the connecting member such that the target is inclined with respect to the moving direction of the valve stem whereby the inclined detection surface which faces the displacement sensor in an opposed manner may be formed on the target.

Due to such a constitution, it is unnecessary to form the target per se into a particular shape and hence, time and efforts for forming the target and a part cost can be reduced. It is needless to say that the target may be formed of a quadrangular columnar body which is mounted on the base member in an erected manner, and may form an inclined surface on a surface thereof which faces the displacement sensor in an opposed manner.

It is preferable that a position where the upper end portion of the target is mounted on the connecting member and the position where a lower end portion of the target is mounted on the base member are adjustable.

To enable such adjustment of the mounting positions, for example, the target may be configured such that the target has an upwardly and downwardly elongated rectangular plate-shaped body, upper and lower rotary shafts having a cylindrical shape which have female threads formed on an inner periphery thereof and are relatively rotatable with respect to the body are made to pass through upper and lower end portions of the body respectively, a target accommodating recessed portion is formed on the base member and the connecting member respectively, an upper end portion of the target is fitted into the target accommodating recessed portion formed on the connecting member, and is mounted on the connecting member by an adjustment bolt, a compression coil spring which is received by a bottom surface of the target accommodating recessed portion and the target is wound around the adjustment bolt, the upper end portion of the target is made to move against a biasing force of the compression coil spring so that a position of the upper end portion of the target is adjustable, the upper end portion of the target is fixed to the connecting member by allowing a stop bolt to pass through an elongated hole formed in the connecting member and to be threadedly engaged with the upper rotary shaft, and the lower end portion of the target is fixed to the base member by allowing a stop bolt to pass through an elongated hole formed in the base member and to be threadedly engaged with the lower rotary shaft.

Further, it is preferable that a cylindrical linear bushing which guides the guide shaft is inserted into each guide shaft insertion hole formed in the sensor support member, and a compression coil spring which biases the sensor support member downward is fitted on each guide shaft.

The linear bushing includes: an outer sleeve which is assembled to the guide shaft on which a raceway groove is formed such that the outer sleeve is linearly movable relative to the guide shaft; and a plurality of balls mounted between the raceway groove formed on the guide shaft and a raceway groove formed on the outer sleeve. The smooth relative movement is ensured between the linear bushing and the guide shaft due to the rolling of the plurality of balls.

A gap formed between the guide shaft and the linear bushing is made as small as possible so as to eliminate a play between both members. With the use of the linear bushing in which balls roll, the sensor support member can be moved smoothly relative to the guide shaft without the play. Further, since the compression coil spring pushes the linear bushing, the whole sensor support member is always biased downward whereby the play of the sensor support member is also prevented.

A male threaded member is threadedly engaged with the sensor support member such that a lower end portion of the male threaded member projects downward from a lower surface of the sensor support member, and the lower end portion of the male threaded member is received by the sensor positioning surface formed on the upper end of the valve stem. Accordingly, the sensor support member is movable upward and downward integrally with the valve stem.

Due to such a constitution, the sensor support member can be positioned with reference to an axis of the male threaded member and hence, positioning of the sensor support member can be performed easily.

A pair of support struts which is supported on the base member and supports the connecting member may be provided, and a biasing member which applies an elastic force to the sensor support member may be mounted on each support strut.

When a play is generated along with the movement of the sensor support member (displacement sensor) with respect to the target, the detection accuracy is lowered. Since the target has the lower end portion thereof mounted on the base member and the upper end portion thereof mounted on the connecting member, with the use of one pair of support struts which is supported on the base member and supports the connecting member and with the use of an elastic force applied to the sensor support member by the biasing members mounted on the respective support struts, a distance between the target and the displacement sensor becomes stable thus further enhancing detection accuracy.

It is preferable that the opening degree detection device for an automatically operated valve of the present invention includes a CPU which executes predetermined processing in accordance with a program, and displacement values from a fully open position to a fully closed position are stored and linear correction is applied to the displacement values using the CPU and a built-in memory. Due to such a constitution, irregularities on performances of the valves can be absorbed. Further, by mounting LED display lamps on the device, it is also possible to allow an operator to visually recognize a valve operation state.

It is preferable that the automatically operated valve is an automatically operated valve which uses a resin-made diaphragm as a valve element, and includes a valve element exchange timing determination means which obtains a change with time of an output signal of the displacement sensor at a fully closed position of the fluid flow path, and informs the arrival of exchange timing of the resin-made diaphragm when a value of the output signal exceeds a predetermined value. The valve element exchange timing determination means is formed of a predetermined program and is installed in the CPU.

The diaphragm made of a resin (for example, PTFE) usually has the two-layered structure with a backup rubber. When opening and closing of the valve are repeated, property of the diaphragm is changed with time (the backup rubber is deteriorated), and the sealing performance of the diaphragm is deteriorated. Further, when the diaphragm is used continuously, the diaphragm is broken. By detecting the opening degree of the fluid flow path, a change with time of the property of the diaphragm (deterioration of the backup rubber) appears as a change in closed position (the closed position being lowered along with the deterioration of the backup rubber). By automatically diagnosing such a change in closed position using the opening degree detection device for an automatically operated valve and by generating an alarm requesting an exchange of the diaphragm, the exchange of the diaphragm can be performed at a proper timing.

In this specification, with respect to "upward and downward", "upward" means a side close to the valve element of a valve stem of the automatically operated valve, and "downward" means a side opposite to the side close to the valve element of a valve stem of the automatically operated valve. However, this "upward and downward" is merely used for the sake of convenience. That is, the automatically operated value may be installed upside down or may be installed not only on a horizontal plane but also on a vertical plane.

Advantageous Effects of Invention

According to the opening degree detection device for an automatically operated valve of the present invention, the opening degree detection device includes: a base member which is detachably mounted on the automatically operated valve; a displacement sensor which is moved along with the valve stem; and a target having an inclined detection surface which is detected by the displacement sensor, wherein the target is fixed to the base member and the displacement sensor is movably supported on the base member. Due to such a constitution, the displacement sensor and the target may be assembled to the base member in advance and, thereafter, the base member may be mounted on the automatically operated valve. Accordingly, an assembling operation of the opening degree detection device into the automatically operated valve can be easily performed. Further, positioning of the displacement sensor and the target can be performed before the operation of assembling the opening degree detection device into the automatically operated valve and hence, the detection accuracy at the time of assembling can be easily ensured. Further, provided that an automatically operated valve is an automatically operated valve where an upper end portion of a valve stem projects upward from a casing, the opening degree detection device for an automatically operated valve of the present invention can be installed on the automatically operated valve and hence, the opening degree detection device for an automatically operated valve of the present invention is easily applicable to an existing automatically operated valve.

REFERENCE SIGNS LIST (2) automatically operated valve
(3) opening degree detection device for an automatically operated valve
(4) base plate (base member)
(5) displacement sensor
(6) target
(6a) detection surface
(11) valve body
(11a) fluid flow-in path
(11b) fluid flow-out path
(13) casing
(14) valve stem
(16) diaphragm
(21) sensor support member
(21a) guide shaft insertion hole
(22) guide means
(23) support strut
(24) upper plate (connecting member)
(25a) top surface (sensor positioning surface)
(31) male threaded member
(32) guide shaft
(33) linear bushing
(34) compression coil spring
(50) leaf spring (biasing member)

DESCRIPTION OF EMBODIMENTS

Embodiments of the present invention are explained in conjunction with drawings hereinafter.

Figure 1:
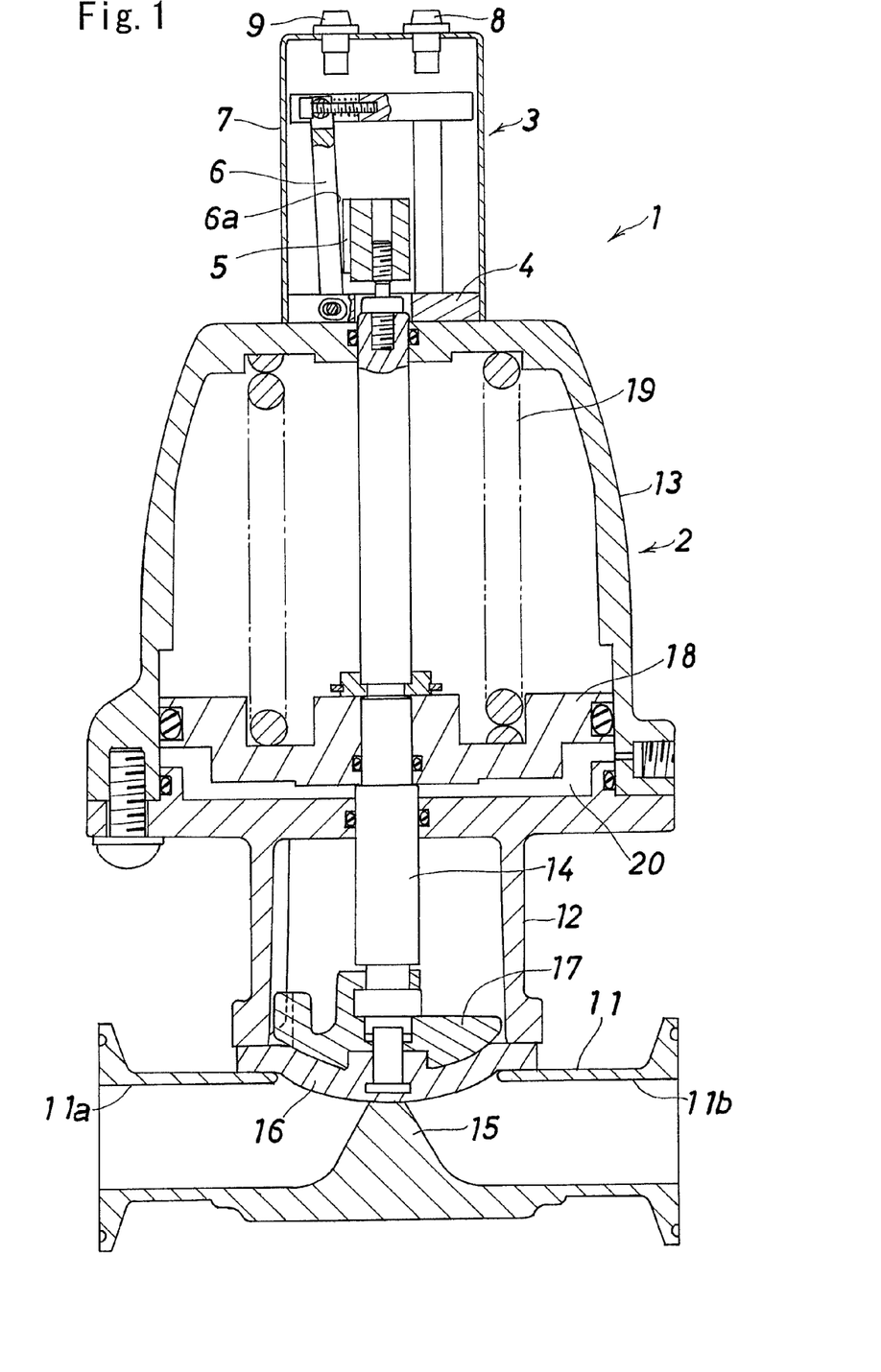
FIG. 1 is a front cross-sectional view showing a first embodiment of a fluid controller provided with an opening degree detection device for an automatically operated valve according to the present invention.

FIG. 1 shows a fluid controller provided with an opening degree detection device for an automatically operated valve according to the present invention. The fluid controller (1) is constituted of: an automatically operated valve (2) where a fluid flow path is opened or closed by a pneumatic actuator; and an opening degree detection device for an automatically operated valve (3) which is mounted on a top portion of the automatically operated valve (2).

The automatically operated valve (2) includes: a valve body (11) in which a fluid flow-in path (11a) and a fluid flow-out path (11b) are formed; a casing (13) which is mounted above the valve body (11) by way of a bonnet (12); a valve stem (14) which is arranged in the inside of the bonnet (12) and the casing (13) in an upwardly and downwardly movable manner; a valve seat (15) which is provided at a boundary portion between the fluid flow-in path (11a) and the fluid flow-out path (11b); a diaphragm (16) which opens or closes the fluid flow paths (11a) (11b) by being separated from or pressed to the valve seat (15); a compressor (17) which is fixed to a lower end portion of the valve stem (14) and is connected to the diaphragm (16); a piston (18) which is fixed to an intermediate portion of the valve stem (14); a compression coil spring (resilient member) (19) which biases the piston (18) downward; and an operation air introduction chamber (20) which is defined by a top wall of the bonnet (12), the piston (18) and a lower end portion of a peripheral wall of the casing (13).

The constitution of the automatically operated valve (2) is known, and the pneumatic actuator is constituted of the piston (18), the operation air introduction chamber (20) and the like.

The diaphragm (16) is made of a resin (for example, PTFE), and forms the two-layered structure with a backup rubber which is arranged on a side of the diaphragm (16) brought into contact with the compressor (17).

According to the automatically operated valve (2) of this embodiment, in a state shown in FIG. 1 where compressed air is not introduced into the operation air introduction chamber (20), the piston (18) is biased by the compression coil spring (19) so that the valve stem (14) is positioned at a lower position where the diaphragm (16) is brought into contact with the valve seat (15) so that the fluid flow paths (11a) (11b) are brought into a closed state. On the other hand, when compressed air is introduced into the operation air introduction chamber (20), an upward force is applied to the piston (18) due to the introduced compressed air so that the valve stem (14) is moved upward whereby the fluid flow paths (11a) (11b) are brought into an open state.

The opening degree detection device for an automatically operated valve (3) is provided for taking out an opening degree of the fluid flow paths (11a) (11b) of the automatically operated valve (2) to the outside after converting the opening degree into a numerical value. The opening degree detection device (3) includes: a base plate (base member) (4); a displacement sensor (5) which is supported on the base plate (4) in an upwardly and downwardly movable manner; a target (6) which is fixed to the base plate (4) in an inclined manner in a state where the target (6) faces the displacement sensor (5) in an opposed manner; and a cap (7) which covers these parts. Both the displacement sensor (5) and the target (6) are held on the base plate (4), and the base plate (4) is detachably mounted on a top wall of the casing (13) of the automatically operated valve (2). A blue LED display lamp (8) which indicates whether the fluid flow paths (11a) (11b) are in an open or closed state and a red LED display lamp (9) which indicates that the fluid flow paths (11a) (11b) are in an abnormal state are mounted on a top wall of the cap (7).

The displacement sensor (5) is formed of a non-contact magnetic sensor, for example. The displacement sensor (5) is moved upward and downward along with the upward and downward movement of the valve stem (14), and a distance between the displacement sensor (5) and a detection surface (6a) of the target (6) is changed along with such movement of the displacement sensor (5). By converting the distance between the displacement sensor (5) and the detection surface (6a) of the target (6) into an upward or downward movement distance of the valve stem (14), the displacement sensor (5) can detect an opening degree of the fluid flow paths (11a) (11b).

Hereinafter, the explanation is made with respect to the detailed constitution of the first embodiment of the opening degree detection device for an automatically operated valve (3) according to the present invention in conjunction with FIG. 2 to FIG. 6.

Figure 2:
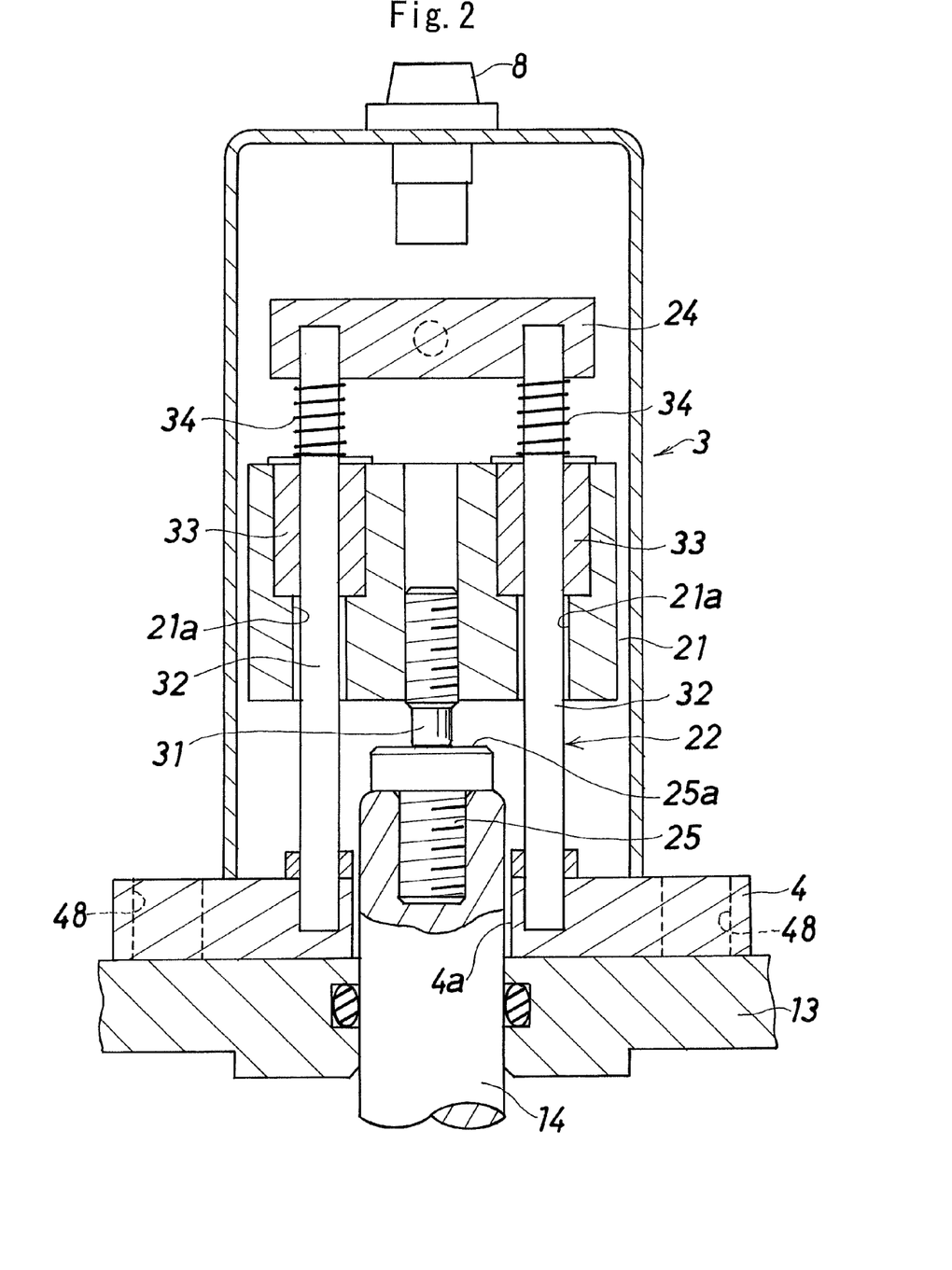
FIG. 2 is a side cross-sectional view of the first embodiment of the opening degree detection device for an automatically operated valve according to the present invention.
Figure 3:
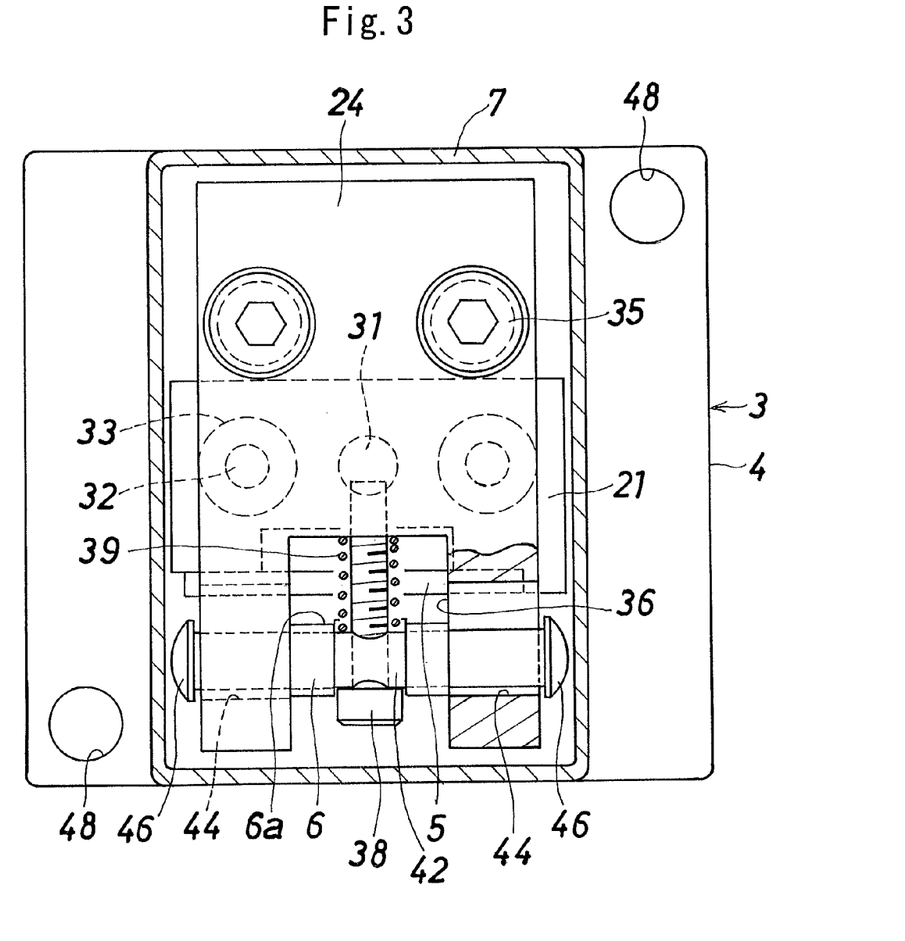
FIG. 3 is a plan view of the opening degree detection device for an automatically operated valve according to the present invention.
Figure 4:
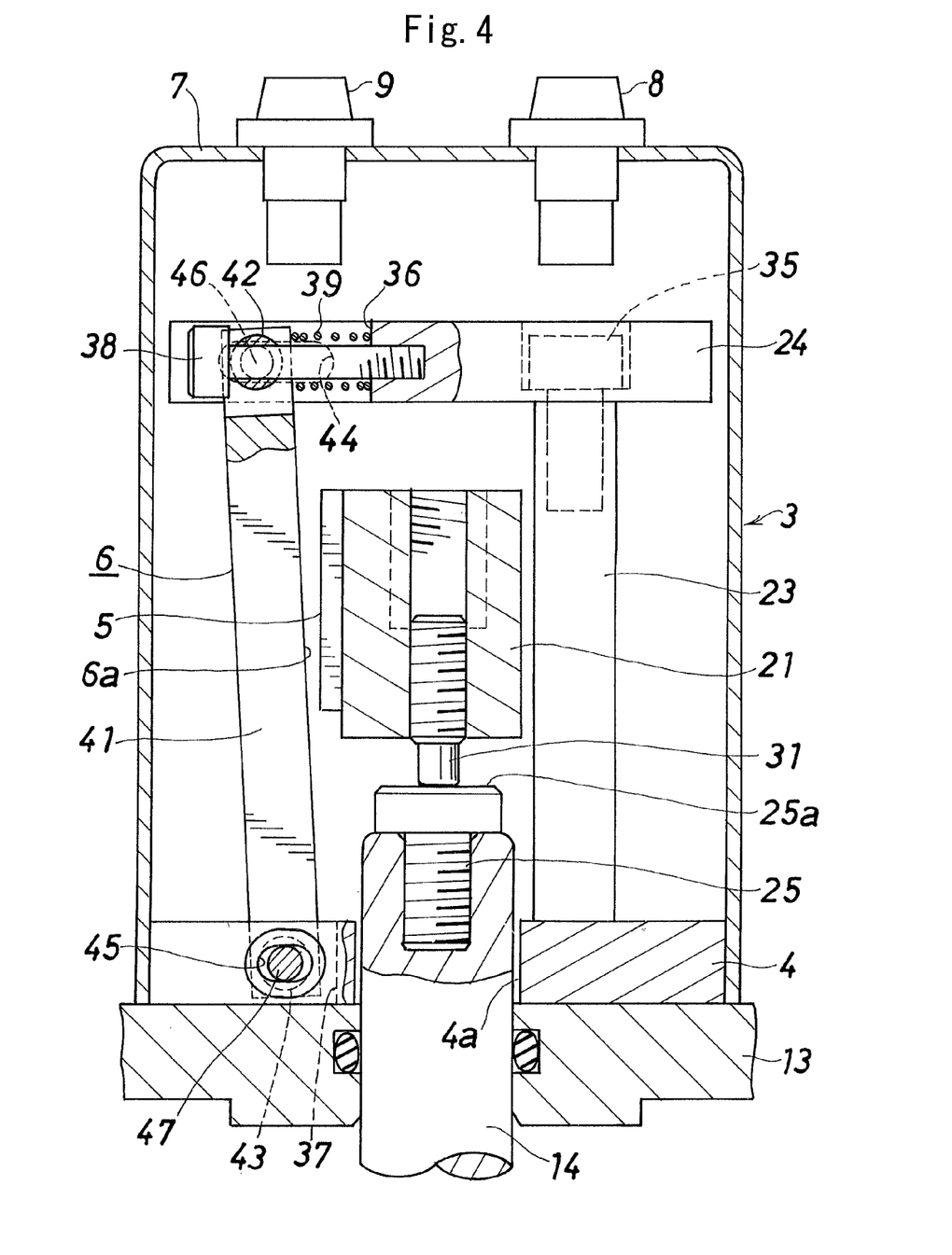
FIG. 4 is a front cross-sectional view of the opening degree detection device for an automatically operated valve showing a state where a valve is fully opened.
Figure 5:
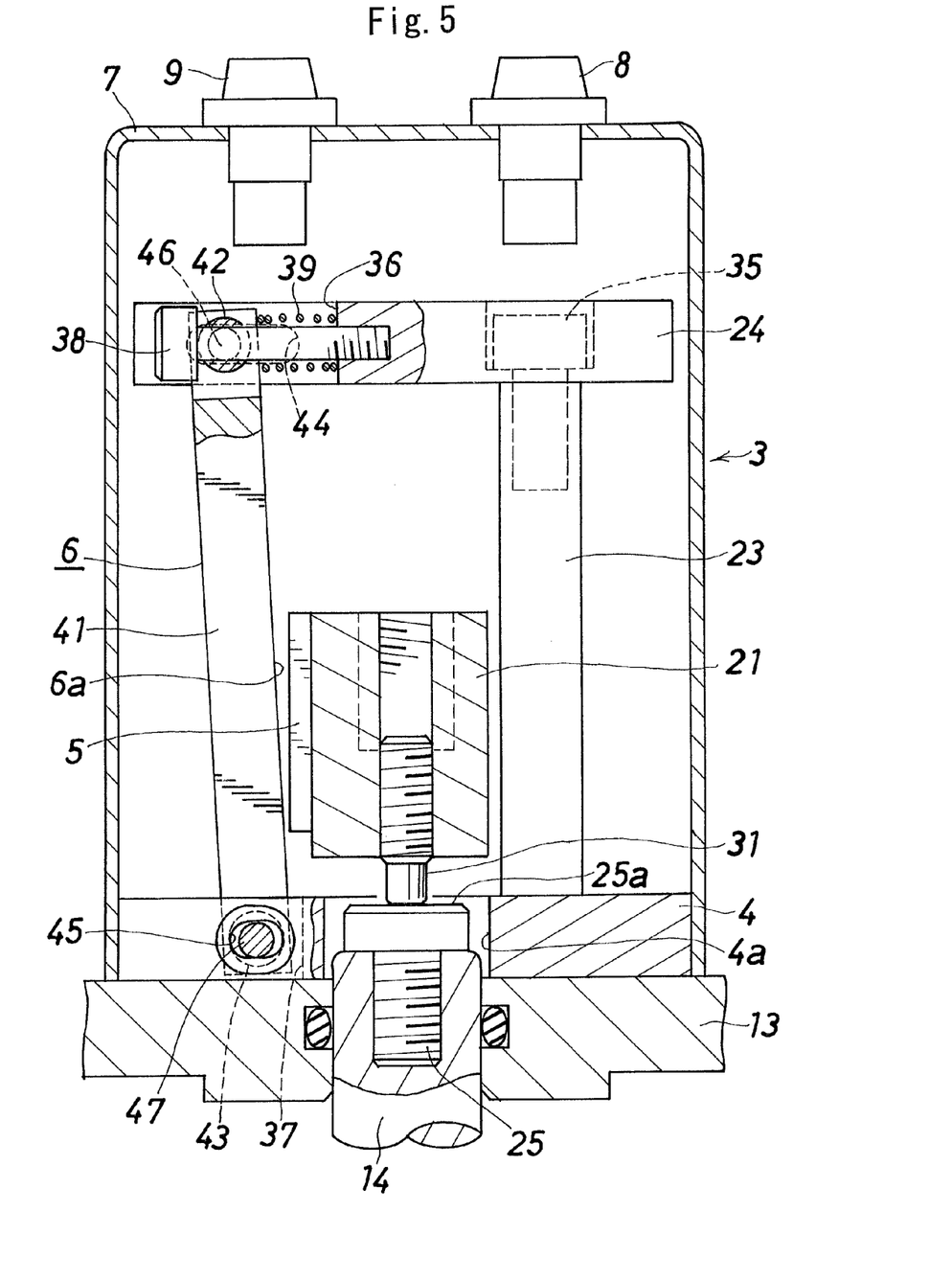
FIG. 5 is a view corresponding to FIG. 4 showing a state where the valve is fully closed.

In the explanation made hereinafter, left and right sides in FIG. 2 are referred to as left and right sides of the opening degree detection device. A right side in FIG. 4 is referred to as a front side of the opening degree detection device, and a left side in FIG. 4 is referred to as a rear side of the opening degree detection device. FIG. 4 is a cross-sectional view showing the opening degree detection device (3) of FIG. 1 in an enlarged manner. FIG. 2 is a cross-sectional view of the opening degree detection device (3) taken along the direction orthogonal to FIG. 4. FIG. 3 is a plan view which corresponds to FIG. 2. While FIG. 4 is a view showing a state where the fluid flow path is in an open state, FIG. 5 is a cross-sectional view showing a state where the fluid flow path is in a closed state.

The opening degree detection device (3) includes: the base plate (base member) (4) which has a through hole (4a) which allows an upper end portion of the valve stem (14) to pass therethrough at a center portion thereof, and is detachably mounted on the top surface of the casing (13) of the automatically operated valve (2); a sensor support member (21) which is moved upward or downward along with the valve stem (14); a guide means (22) which guides an upward or downward movement of the sensor support member (21); the displacement sensor (5) which is mounted on the sensor support member (21); the target (6) which is fixed to a rear portion of the base plate (4) in such a state that the target (6) faces the displacement sensor (5) in an opposed manner, and has the inclined detection surface (6a) which is detected by the displacement sensor (5) on a front surface thereof; a pair of support struts (23) which is supported on the base plate (4) in such a state where the support struts (23) face the target (6) in an opposed manner in the longitudinal direction of the device with the sensor support member (21) interposed therebetween; an upper plate (connecting member) (24) which is supported on the pair of support struts (23) and to which an upper end portion of the target (6) is mounted; and the cylindrical cap (7) which has a top wall on which the blue LED display lamp (8) and the red LED display lamp (9) are mounted and is fixed to the base plate (4).

The size of the base plate (4) is set such that left and right edge portions of the base plate (14) are exposed from a lower end of a peripheral wall of the cap (7), and the size of the upper plate (24) is set such that the upper plate (24) can be accommodated in the inside of the cap (7).

The upper end portion of the valve stem (14) is formed such that the upper end portion of the valve stem (14) projects upward from the casing (13) of the automatically operated valve (2), and a male threaded member (25) having a flat top surface (25a) is threadedly engaged with the upper end portion of the valve stem (14). The top surface (25a) forms a sensor positioning surface which receives a lower end of the sensor support member (21).

The sensor support member (21) has an approximately rectangular parallelepiped shape whose longitudinal sides extend in the lateral direction, and the displacement sensor (5) is arranged at a lateral (longitudinal) center portion of the sensor support member (21). A male threaded member (31) is threadedly engaged with the center portion of the sensor support member (21) such that a lower end portion of the male threaded member (31) projects from a lower surface of the sensor support member (21). A pair of guide shaft insertion holes (21a) which penetrates the sensor support member (21) in the upward and downward direction is formed in both left and right sides of the sensor support member (21) such that the guide shaft insertion holes (21a) sandwich the male threaded member (31) (portion where the displacement sensor (5) is arranged) therebetween. A lower end of the male threaded member (31) is received by the flat top surface (25a) which is formed on an upper end of the valve stem (14) so that the sensor support member (21) is upwardly and downwardly movable integrally with the valve stem (14).

The guide means (22) is constituted of: a pair of guide shafts (32) which extends between the base plate (4) and the upper plate (24) in a state where the guide shafts (32) face each other in the lateral direction with the sensor support member (21) interposed therebetween; and the above-mentioned pair of guide shaft insertion holes (21a) which is formed in the sensor support member (21). The respective guide shafts (32) extend in the vertical direction perpendicular to the base plate (4) and the upper plate (24), and are made to pass through the respective guide shaft insertion holes (21a), and lower end portions of the guide shafts (32) are fitted into recesses formed on an upper surface of the base plate (4). Upper end portions of the respective guide shafts (32) are fitted into recesses formed on a lower surface of the upper plate (24) so that the upper plate (24) functions as a connecting member which connects the upper end portions of the pair of guide shafts (32) to each other.

In this manner, the pair of guide shafts (32) is mounted on the base plate (4) in an erected manner, and the sensor support member (21) is configured to move upward and downward integrally with the valve stem (14) by being guided by the pair of guide shafts (32). Due to such a constitution, when the sensor support member (21) is moved upwardly and downwardly with respect to the base plate (4), there is no possibility that the sensor support member (21) will be inclined or caught by the guide shafts (32) so that the smooth movement of the sensor support member (21) and the displacement sensor (5) can be ensured.

A cylindrical linear bushing (33) which guides the guide shaft (32) is inserted into each guide shaft insertion hole (21a) formed in the sensor support member (21), and a compression coil spring (34) is fitted on an upper portion of each guide shaft (32). An upper end of the compression coil spring (34) is received by the lower surface of the upper plate (24), and a lower end of the compression coil spring (34) is received by an upper surface of the linear bushing (33).

The pair of left and right support struts (23) is mounted on a front portion of the base plate (4) such that the support struts (23) face the target (6) in an opposed manner with the sensor support member (21) interposed therebetween. The support struts (23) are mounted vertically, and support the upper plate (24) by making male threaded portions formed on lower end portions thereof threadedly engaged with female threaded portions formed on the upper surface of the base plate (4) and upper end portions thereof fixed to the upper plate (24) using bolts (35) (see FIG. 3).

The target (6) has an upwardly and downwardly elongated rectangular plate-shaped body (41). A rotary shaft insertion hole which penetrates the body (41) in the lateral direction (widthwise direction) is formed in upper and lower end portions of the body (41) respectively. Upper and lower rotary shafts (42), (43) which are relatively rotatable with respect to the body (41) are made to pass through the rotary shaft insertion holes respectively. Both upper and lower rotary shafts (42) (43) have a cylindrical shape and have female threads formed on an inner periphery thereof respectively.

A target accommodating recessed portion (36) which opens rearward is formed on a center portion of a rear portion of the upper plate (24). A target accommodating recessed portion (37) which opens rearward is also formed on a center portion of a rear portion of the base plate (4).

In a lateral center portion of the upper end portion of the body (41) of the target (6) and a lateral center portion of the upper rotary shaft (42), adjustment bolt insertion holes which penetrate these center portions in the longitudinal direction are formed respectively. A female threaded portion for an adjustment bolt which extends in the longitudinal direction is formed on a center portion of a bottom surface of the target accommodating recessed portion (36) formed on the upper plate (24). The upper end portion of the target (6) is fitted into the target accommodating recessed portion (36) formed on the upper plate (24), and is mounted on the upper plate (24) by an adjustment bolt (38) extending in the longitudinal direction. A compression coil spring (39) which is received by the bottom surface of the target accommodating recessed portion (36) and a front surface of the target (6) is wound around the adjustment bolt (38). The position of the upper end portion of the target (6) in the longitudinal direction is adjustable by moving the upper end portion of the target (6) in the longitudinal direction against a biasing force of the compression coil spring (39).

A lower end portion of the target (6) is fitted into the target accommodating recessed portion (37) formed on the base plate (4). The upper end portion of the target (6) is fixed to the upper plate (24) by allowing stop bolts (46) to pass through longitudinally elongated holes (44) from left and right side surfaces of the upper plate (24) to left and right side surfaces of the target accommodating recessed portion (36) and to be threadedly engaged with the upper rotary shaft (42). The lower end portion of the target (6) is fixed to the base plate (4) by allowing stop bolts (47) to pass through longitudinally elongated holes (45) from left and right side surfaces of the base plate (4) to left and right side surfaces of the target accommodating recessed portion (37) and to be threadedly engaged with the lower rotary shaft (43). With the provision of the elongated holes (44) formed in the upper plate (24) and the elongated holes (45) formed in the base plate (4), the longitudinal position of the upper end portion of the target (6) and the longitudinal position of the lower end portion of the target (6) can be adjusted. Due to such a constitution, an inclination angle of the detection surface (6a) of the target (6) can be adjusted, and the interference between the displacement sensor (5) and the detection surface (6a) of the target (6) which may occur when the sensor support member (21) is moved upward or downward can be prevented.

In this manner, the target (6) has the lower end thereof mounted on the base plate (4) and the upper end portion thereof mounted on the upper plate (24) such that the target (6) is inclined with respect to the moving direction of the valve stem (14). Due to such a constitution, the inclined detection surface (6a) which faces the displacement sensor (5) in an opposed manner is formed on the target (6) without additionally machining the detection surface (6a).

Figure 6:
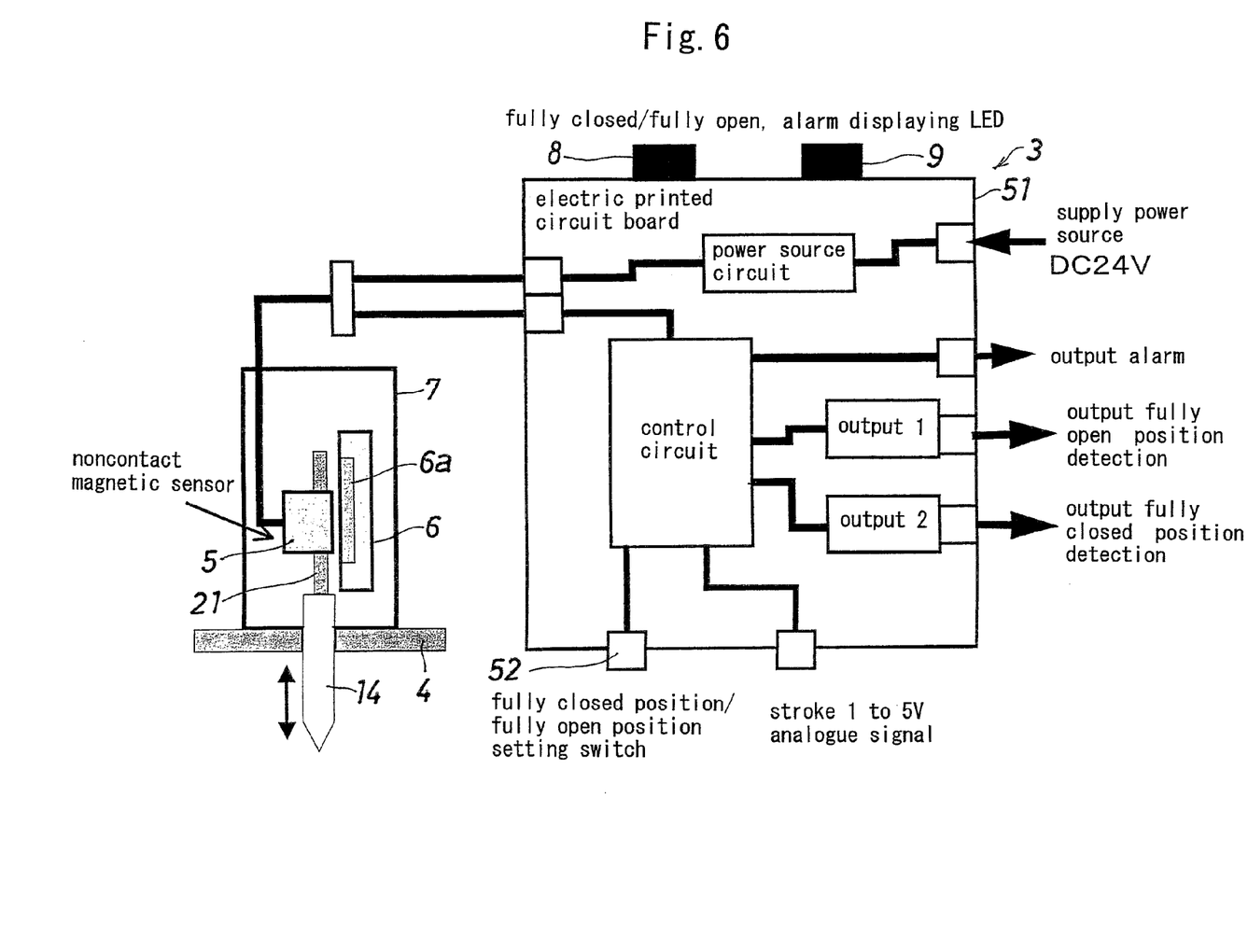
FIG. 6 is a block diagram showing a control part of the opening degree detection device for a manual valve according to the present invention.

As shown in FIG. 6, the opening degree detection device (3) further includes a printed circuit board (CPU) (51) for performing data processing. A power source circuit which supplies a direct current power source of 24V and a control circuit which processes values measured by the displacement sensor (5) are assembled into the printed circuit board (51). By executing predetermined processing in accordance with a program installed in the printed circuit board (51), the control circuit outputs an amount of upward or downward movement (stroke) of the valve stem (14) as an analog signal, and also outputs a detection result of a fully open position or a fully closed position.

According to the above-mentioned opening degree detection device (3), when the valve stem (14) is moved upward or downward, the displacement sensor (5) is moved upward or downward relative to the target (6) fixed to the base plate (4) so that the distance between the displacement sensor (5) and the detection surface (6a) of the target (6) is changed, and this change in distance is measured by the displacement sensor (5). Accordingly, by converting such a value measured by the displacement sensor (5) into an amount of movement of the valve stem (14) using an angle of the detection surface (6a), an amount of upward or downward movement of the valve stem (14) (opening degree of the fluid flow paths (11a) (11b)) can be detected continuously.

The opening degree detection device (3) includes a manual switch (52) for setting a fully closed position and a fully open position. With respect to the opening degree of the fluid flow paths (11a) (11b), in a state where the opening degree detection device (3) is mounted on the automatically operated valve (2) (at the time of replacing a packing, at the time of performing maintenance or the like after the installation of pipes), the valve stem (14) is operated until the valve stem (14) assumes a fully closed position thus setting a point where the opening degree is 0%. Then, the valve stem (14) is operated until the valve stem (14) assumes a fully open position thus setting a point where the opening degree is 100%. Then, using the control circuit and a built-in memory, displacement values of the opening degree ranging from the fully open position to the fully closed position are stored and the linear correction is made with respect to the displacement values of the opening degree. Due to such an operation, irregularities in the opening degree of the fluid flow paths can be absorbed.

When the opening degree detection device (3) is in a normal operation state, the blue LED display lamp (8) which indicates that the fluid flow path is in a fully open state or in a fully closed state is turned on. On the other hand, when the opening degree detection device (3) is in an abnormal state, an alarm is outputted and the red LED display lamp (9) is turned on.

The control circuit incorporates therein a program (valve element exchange timing determination means) which obtains a change with time in an output signal of the displacement sensor (5) with the fluid flow path (11a) (11b) at a fully closed position, and informs the arrival of exchange timing of the resin-made diaphragm (16) when a value of the output signal exceeds a predetermined value. Accordingly, the control circuit also executes the determination of the opening degree of the fluid flow paths (11a) (11b).

When opening and closing of the valve is repeated, property of the resin-made diaphragm (16) is changed with time (the backup rubber is deteriorated), and the sealing performance of the diaphragm (16) is deteriorated. When the diaphragm (16) is further used continuously, the diaphragm (16) is broken. A change with time of the property of the diaphragm (16) (deterioration of the backup rubber) appears as a change in closed position (the closed position being lowered along with the deterioration of the backup rubber). Accordingly, by automatically diagnosing such a change in closed position using the opening degree detection device (3) and by generating an alarm requesting an exchange of the diaphragm (16), the exchange of the diaphragm (16) can be performed at a proper timing.

A lifetime of the diaphragm (16) differs depending on conditions of the process (temperature, pressure, valve opening or closing speed, the number of times of opening and closing) and hence, it is difficult to predict the lifetime of the diaphragm (16). When a usable period of the diaphragm (16) is set and the diaphragm (16) is exchanged after the diaphragm (16) is used for a predetermined period, there is a possibility that the diaphragm (16) is exchanged although the diaphragm (16) is still in a usable state or a possibility that timing that the diaphragm (16) is to be exchanged is delayed so that the diaphragm (16) is broken. According to the present invention, the opening degree is detected and the diaphragm (16) is exchanged based on the detection of the opening degree and hence, the diaphragm (16) can be exchanged with no waste in time before being broken.

The above-mentioned opening degree detection device (3) is assembled in advance, the male threaded member (25) is threadedly engaged with the upper end portion of the valve stem (14) of the automatically operated valve (2) and, thereafter, the opening degree detection device (3) is detachably mounted on the casing (13) by bolts using bolt insertion holes (48) formed in the base plate (4) and threaded holes formed in the casing (13).

In assembling the opening degree detection device (3), firstly, the respective lower end portions of the pair of guide shafts (32) which guides the sensor support member (21) are fitted into the guide shaft inserting recesses formed on the base plate (4). The male threaded portions formed on the lower end portions of the pair of support struts (23) are threadedly engaged with the female threaded portions formed on the base plate (4). Then, the sensor support member (21) on which the displacement sensor (5) is mounted is fitted on the pair of guide shafts (32), and the linear bushings (33) and the compression coil springs (34) are arranged on the pair of guide shafts (32). Next, the upper plate (24) is fixed to the upper end portions of the pair of support struts (23) using the bolts (35). Then, the target (6) into which the upper and lower rotary shafts (42), (43) are fitted is mounted on the upper plate (24) using the adjustment bolt (38). Next, the target (6) is fixed to the upper plate (24) and the base plate (4) by the stop bolts (46), (47) using the elongated holes (44) formed in the upper plate (24) and the elongated holes (45) formed in the base plate (4) such that the target (6) does not interfere with the displacement sensor (5).

Figure 7:
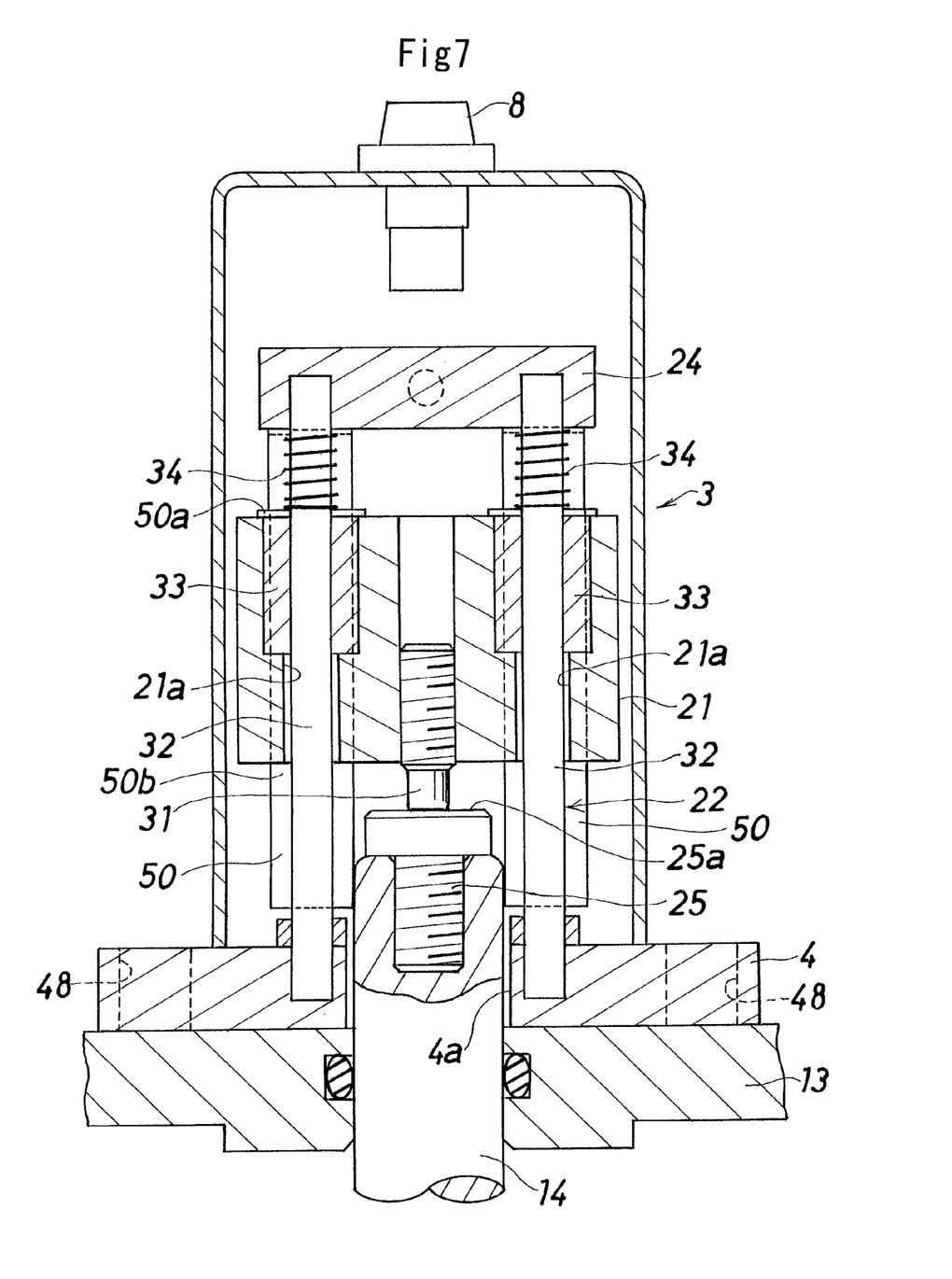
FIG. 7 is a cross-sectional side view of a second embodiment of the opening degree detection device for an automatically operated valve according to the present invention.
Figure 8:
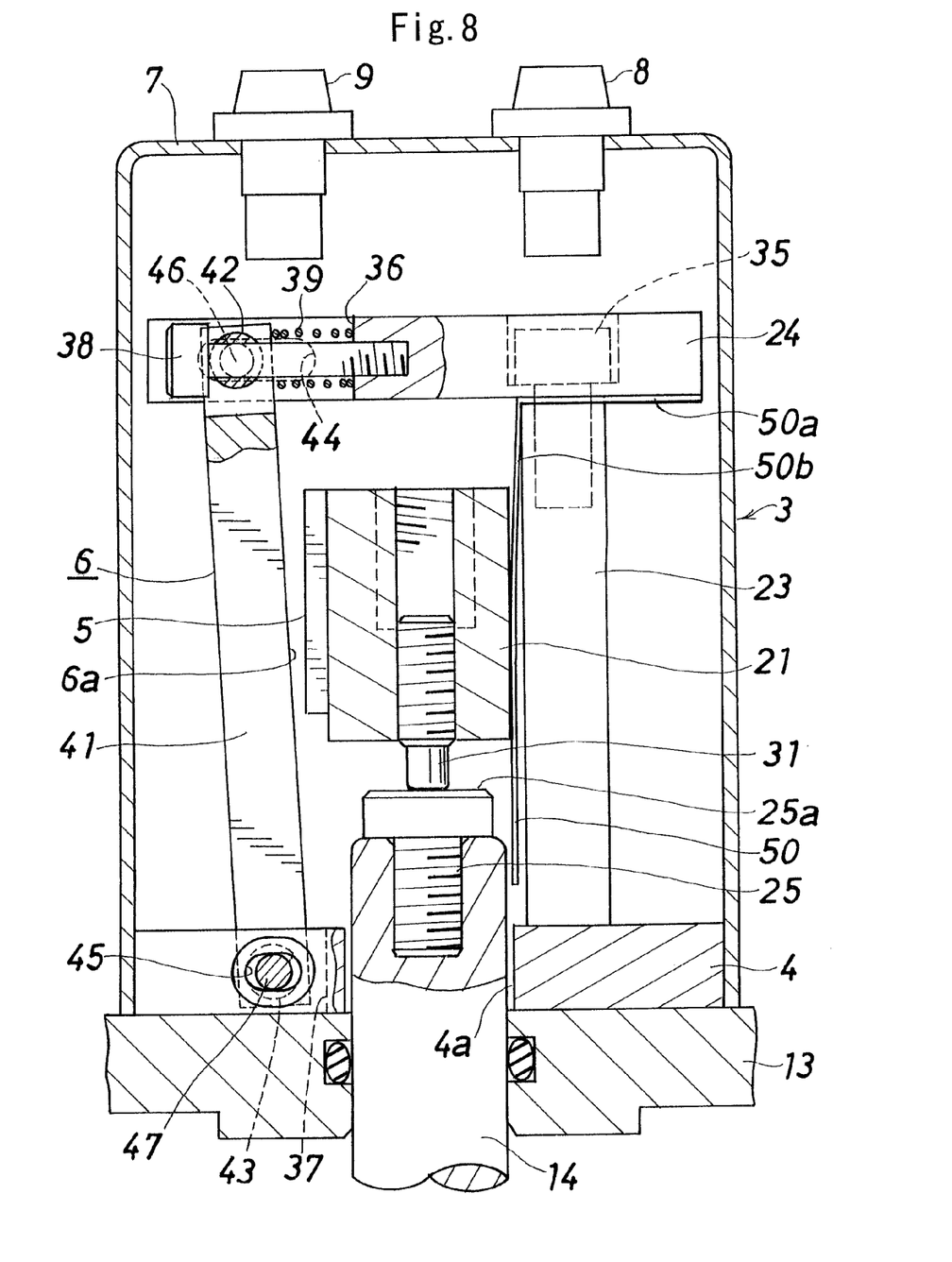
FIG. 8 is a cross-sectional front view of the opening degree detection device for an automatically operated valve showing a state where a valve is fully opened.

FIG. 7 and FIG. 8 show the second embodiment of an opening degree detection device for an automatically operated valve (3) according to the present invention. In the drawings, the constitutions equal to the corresponding constitutions of the first embodiment are given same symbols, and the explanation of the constitutions is omitted.

As shown in FIG. 7 and FIG. 8, in this embodiment, L-shaped leaf springs (biasing member) (50) which apply a resilient force to a sensor support member (21) are mounted on the support struts (23) respectively. A horizontal portion (50a) of each leaf spring (50) is sandwiched between an upper end surface of the support strut (23) and a lower surface of the upper plate (24), and a portion (50b) of the leaf spring (50) which is bent with respect to the horizontal portion (50a) extends downward between the support strut (23) and the sensor support member (21). When the leaf spring (50) is in a free state, the leaf spring (50) assumes an inclined state where a lower end of the leaf spring (50) is positioned on a sensor support member (21) side with respect to a perpendicular, and is brought into contact with the sensor support member (21) thus applying a resilient force to the sensor support member (21).

In this embodiment, while the sensor support member (21) constitutes a movable member which is moved integrally with the valve stem (14), the base plate (4), the target (6), the support struts (23) and the upper plate (24) constitute fixed members. There exists a possibility that the position of the displacement sensor (5) with respect to the target (6) is changed due to a play present in the threaded engaging portion along with the movement of the sensor support member (21). However, such displacement can be suppressed by the leaf springs (50). In this manner, according to the second embodiment, a distance between the target (6) and the displacement sensor (5) becomes stable so that the detection accuracy can be further enhanced.

Here, the opening degree detection device for an automatically operated valve (3) according to the present invention includes the valve element exchange timing determination means which informs the arrival of exchange timing of the resin-made diaphragm (16) so that the device (3) is particularly preferably applicable to the automatically operated valve (2) having a resin-made diaphragm (16). However, the valve element exchange timing determination means is optionally provided to the opening degree detection device (3) according to the present invention. Accordingly, the opening degree detection device (3) according to the present invention is also preferably applicable to an automatically operated valve having a metal-made diaphragm or other automatically operated valves having various kinds of constitutions.

INDUSTRIAL APPLICABILITY

The opening degree detection device for an automatically operated valve according to the present invention can be suitably installed in an automatically operated valve for detecting an opening degree of a fluid flow path. According to the present invention, it is possible to acquire an opening degree detection device for an automatically operated valve which is easily assembled into an automatically operated valve, makes it easy to ensure detection accuracy at the time of assembling the opening degree detection device, and is easily applicable to an existing automatically operated valve.

The invention claimed is:

1. An opening degree detection device for an automatically operated valve which is installed in an automatically operated valve where a fluid flow path formed in a valve body is opened or closed due to the movement of a valve stem caused by an operation of an actuator, the opening degree detection device comprising:
a base member which is detachably mounted on the automatically operated valve;
a displacement sensor which is moved along with the valve stem; and
a target having an inclined detection surface which is detected by the displacement sensor,
wherein: the target is fixed to the base member, and the displacement sensor is movably supported on the base member;
the displacement sensor is supported on the valve stem by way of a sensor support member;
the sensor support member is supported on the base member by way of a guide means,
the guide means includes: at least one guide shaft which is mounted on the base member in an erected manner; and at least one guide shaft insertion hole which is formed in the sensor support member, and allows each guide shaft to pass therethrough;
the sensor support member is integrally moved with the valve stem by being guided by the guide shaft;
the at least one guide shaft is provided by one pair, respective upper end portions of the guide shafts are fixed to a connecting member;
the target is formed into a rectangular plate shape, and has a lower end portion thereof mounted on the base member and an upper end portion thereof mounted on the connecting member such that the target is inclined with respect to the moving direction of the valve stem whereby an inclined detection surface which faces the displacement sensor in an opposed manner is formed on the target.

2. The opening degree detection device for an automatically operated valve according to claim 1, wherein the automatically operated valve is configured such that an upper end portion of the valve stem projects upward from a casing, a sensor positioning surface which receives a lower end of the sensor support member is formed on the upper end portion of the valve stem, the sensor support member and the target are mounted on the base member, and the base member is detachably mounted on the upper end portion of the valve stem.

3. The opening degree detection device for an automatically operated valve according to claim 1, wherein at least one cylindrical linear bushing which guides each guide shaft is inserted into the at least one guide shaft insertion hole formed in the sensor support member, and a compression coil spring which biases the sensor support member downward is fitted on the guide shaft.

4. The opening degree detection device for an automatically operated valve according to claim 2, wherein a male threaded member is threadedly engaged with the sensor support member such that a lower end portion of the male threaded member projects downward from a lower surface of the sensor support member, and the lower end portion of the male threaded member is received by the sensor positioning surface formed on the upper end of the valve stem whereby the sensor support member is movable upward and downward integrally with the valve stem.

5. The opening degree detection device for an automatically operated valve according to claim 1, wherein a pair of support struts which is supported on the base member and supports the connecting member is provided, and a biasing member which applies an elastic force to the sensor support member is mounted on each support strut.

6. The opening degree detection device for an automatically operated valve according to claim 1, wherein the automatically operated valve is an automatically operated valve which uses a resin-made diaphragm as a valve element, and includes a valve element exchange timing determination means which obtains a change with time of an output signal of the displacement sensor at a fully closed position of the fluid flow path, and informs the arrival of exchange timing of the resin-made diaphragm when a value of the output signal exceeds a predetermined value.

7. An opening degree detection device for an automatically operated valve having a fluid flow path formed in a valve body that is opened or closed due to the movement of a valve stem caused by an operation of an actuator, the opening degree detection device comprising:
    a base member which is detachably mounted on the automatically operated valve;
    a displacement sensor which is moved along with the valve stem; and
    a target having an inclined detection surface which is detected by the displacement sensor,
    wherein:
    the displacement sensor is supported on the valve stem by way of a sensor support member,
    the sensor support member is supported on the base member by way of a guide means;
    the guide means includes: at least one guide shaft which is mounted on the base member in an erected manner; and at least one guide shaft insertion hole which is formed in the sensor support member, and allows each guide shaft to pass therethrough;
    the sensor support member is integrally moved with the valve stem by being guided by the guide shaft;
    the target is fixed to the base member;
    the displacement sensor is movably supported on the base member;
    at least one cylindrical linear bushing guides each guide shaft is inserted into the at least one guide shaft insertion hole formed in the sensor support member; and
    a compression coil spring which biases the sensor support member downward is fitted on the guide shaft.

8. The opening degree detection device for an automatically operated valve according to claim 7, wherein the automatically operated valve is configured such that an upper end portion of the valve stem projects upward from a casing, a sensor positioning surface which receives a lower end of the sensor support member is formed on the upper end portion of the valve stem, the sensor support member and the target are mounted on the base member, and the base member is detachably mounted on the upper end portion of the valve stem.

9. The opening degree detection device for an automatically operated valve according to claim 8, wherein a male threaded member is threadedly engaged with the sensor support member such that a lower end portion of the male threaded member projects downward from a lower surface of the sensor support member, and the lower end portion of the male threaded member is received by the sensor positioning surface formed on the upper end of the valve stem whereby the sensor support member is movable upward and downward integrally with the valve stem.

10. The opening degree detection device for an automatically operated valve according to claim 7, wherein the at least one guide shaft is provided by one pair, respective upper end portions of the guide shafts are fixed to a connecting member, the target is formed into a rectangular plate shape, and has a lower end portion thereof mounted on the base member and an upper end portion thereof mounted on the connecting member such that the target is inclined with respect to the moving direction of the valve stem whereby an inclined detection surface which faces the displacement sensor in an opposed manner is formed on the target.

11. The opening degree detection device for an automatically operated valve according to claim 10, wherein a pair of support struts which is supported on the base member and supports the connecting member is provided, and a biasing member which applies an elastic force to the sensor support member is mounted on each support strut.

12. An opening degree detection device for an automatically operated valve which is installed in an automatically operated valve where a fluid flow path formed in a valve body is opened or closed due to the movement of a valve stem caused by an operation of an actuator, wherein
    the opening degree detection device comprising: a base member which is detachably mounted on the automatically operated valve; a displacement sensor which is moved along with the valve stem; and a target having an inclined detection surface which is detected by the displacement sensor, wherein the target is fixed to the base member, and the displacement sensor is movably supported on the base member,
    wherein the automatically operated valve is an automatically operated valve which uses a resin-made diaphragm as a valve element, and includes a valve element exchange timing determination means which obtains a change with time of an output signal of the displacement sensor at a fully closed position of the fluid flow path, and informs the arrival of exchange timing of the resin-made diaphragm when a value of the output signal exceeds a predetermined value.

13. The opening degree detection device for an automatically operated valve according to claim 12, wherein the valve element exchange timing determination means is a control circuit that includes a central processing unit that executes a predetermined program.

14. The opening degree detection device for an automatically operated valve according to claim 12, wherein the displacement sensor is supported on the valve stem by way of a sensor support member, the sensor support member is supported on the base member by way of a guide means, the guide means includes: at least one guide shaft which is mounted on the base member in an erected manner; and at least one guide shaft insertion hole which is formed in the sensor support member, and allows each guide shaft to pass therethrough, and the sensor support member is integrally moved with the valve stem by being guided by the guide shaft.

15. The opening degree detection device for an automatically operated valve according to claim 14, wherein at least one cylindrical linear bushing which guides each guide shaft is inserted into the at least one guide shaft insertion hole formed in the sensor support member, and a compression coil spring which biases the sensor support member downward is fitted on the guide shaft.

16. The opening degree detection device for an automatically operated valve according to claim 14, wherein the at least one guide shaft is provided by one pair, respective upper end portions of the guide shafts are fixed to a connecting member, the target is formed into a rectangular plate shape, and has a lower end portion thereof mounted on the base member and an upper end portion thereof mounted on the connecting member such that the target is inclined with respect to the moving direction of the valve stem whereby an inclined detection surface which faces the displacement sensor in an opposed manner is formed on the target.

17. The opening degree detection device for an automatically operated valve according to claim 16, wherein a pair of support struts which is supported on the base member and supports the connecting member is provided, and a biasing member which applies an elastic force to the sensor support member is mounted on each support strut.

18. The opening degree detection device for an automatically operated valve according to claim 14, wherein the automatically operated valve is configured such that an upper end portion of the valve stem projects upward from a casing, a sensor positioning surface which receives a lower end of the sensor support member is formed on the upper end portion of the valve stem, the sensor support member and the target are mounted on the base member, and the base member is detachably mounted on the upper end portion of the valve stem.

19. The opening degree detection device for an automatically operated valve according to claim 18, wherein a male threaded member is threadedly engaged with the sensor support member such that a lower end portion of the male threaded member projects downward from a lower surface of the sensor support member, and the lower end portion of the male threaded member is received by the sensor positioning surface formed on the upper end of the valve stem whereby the sensor support member is movable upward and downward integrally with the valve stem.

* * * * *